United States Patent

Tanaka et al.

[11] Patent Number: 5,907,317
[45] Date of Patent: May 25, 1999

[54] GRAPH DISPLAYING DEVICES AND METHODS

[75] Inventors: Hidekazu Tanaka; Kazuhiko Arikawa, both of Fussa; Takuya Mashimo, Tokyo; Syunsuke Akaza, Tachikawa, all of Japan

[73] Assignee: Casio Computer Co., Ltd., Tokyo, Japan

[21] Appl. No.: 08/696,002

[22] Filed: Aug. 12, 1996

[30] Foreign Application Priority Data

Aug. 25, 1995 [JP] Japan .................................. 6-217813

[51] Int. Cl.$^6$ ...................................................... G09G 5/02
[52] U.S. Cl. ............................ 345/150; 345/134; 345/133; 324/121 R
[58] Field of Search ....................................... 345/150, 440, 345/133, 134; 364/710.01; 324/121 R

[56] References Cited

U.S. PATENT DOCUMENTS

4,794,553  12/1988  Watanabe et al. ................. 364/710.01
5,581,677  12/1996  Myers et al. ............................ 345/440
5,739,823  4/1998  Akaza et al. ............................ 345/440

*Primary Examiner*—Richard A. Hjerpe
*Assistant Examiner*—Francis N. Nguyen
*Attorney, Agent, or Firm*—Frishauf, Holtz, Goodman, Langer & Chick

[57] ABSTRACT

A graph displaying device and method whereby when functional expression data for producing graphs and the conditions of displaying the graphs are set, graphs for functional expressions data input in accordance with the conditions are displayed in corresponding colors on a display. First, functional expression data and corresponding color data which designate display colors of the graphs are input in corresponding relationship. In addition, range data which display coordinates and color data designating display colors of coordinates involved in the range data are input together. In response to this operation, the graphs for the input functional expression data are produced with the range data to which the color data are designated, the last-mentioned color data corresponding to color data which correspond to the functional expression data. The produced graphs and the coordinates are displayed in the corresponding designated colors.

8 Claims, 9 Drawing Sheets

GRAPH DISPLAYING DEVICES AND METHODS

BACKGROUND OF THE INVENTION

1. Field of the Invention

The present invention relates to graph displaying devices and methods which input functional expression data to display same as a graph and more particularly to a graph display device and method which displays input functional expression data graph in color on a color display device.

2. Description of the Related Art

Conventionally, a graph display device, for example, for an electronic graphic calculator which displays input functional expression data as a graph, has been put to practical use.

In the graph display device of this type, when functional data, for example for Y=f(X), is input, numerical values obtained depending on range data set in a range of display on the display device are input to the functional expression and operated to produce graph delineating data which is then displayed as a graph. In this case, with a conventional graph display device and, more particularly, with an electronic graphic calculator, the input functional expression data and its graph data are displayed in black on a white screen of a liquid crystal display device.

When, for example, an X-coordinate range is set to display a graph for functional expression data, only graph data in the set range is displayed as a graph irrespective of the maximum coordinate range displayable in the whole display area of the liquid crystal display.

When only graph data in a set range of coordinates is displayed as a graph as in the conventional graph display device, however, the whole shape of the graph is difficult to understand. Thus, it is necessary to additionally display graph data outside the set range in some form separately from the graph data in the set range.

Graph data for the input functional expression data is conventionally all displayed usually in the same color, so that when, for example, plural-functional expression data is input and the corresponding individual-graph data are together displayed, the individual-graph data are very difficult to discriminate from each other.

SUMMARY OF THE INVENTION

It is therefore an object of the present invention to provide a graph display device and method which is capable of optionally separating and clearly displaying a part of graph data corresponding to functional expression data, and displaying together individualgraph data corresponding to plural functional expression data in a very plain manner.

In order to achieve the above object, according to the present invention, there is provided a graph display device, comprising:

expression inputting means for inputting functional expression data and color data in corresponding relationship;

functional expression data storing means for storing the input functional expression data and the color data in corresponding relationship;

coordinate range data inputting means for inputting coordinate range data for setting a coordinate range and color data in corresponding relationship;

coordinate range data storing means for storing the coordinate range data and color data input by the coordinate range data inputting means in corresponding relationship; and graph producing means for producing a graph for the functional expression data stored in the functional expression data storing means in the coordinate range involved in the coordinate range data and the plural color data stored in corresponding relationship in the coordinate range data storing means, the color data stored in corresponding relationship to the coordinate range data in the coordinate range storing means being the same as the color data stored in corresponding relationship to the functional expression data in the functional expression data storing means.

DESCRIPTION OF THE PREFERRED EMBODIMENTS

An embodiment of a graph displaying device and method according to the present invention will now be described in detail with reference to the accompanying drawings.

Figure 1:
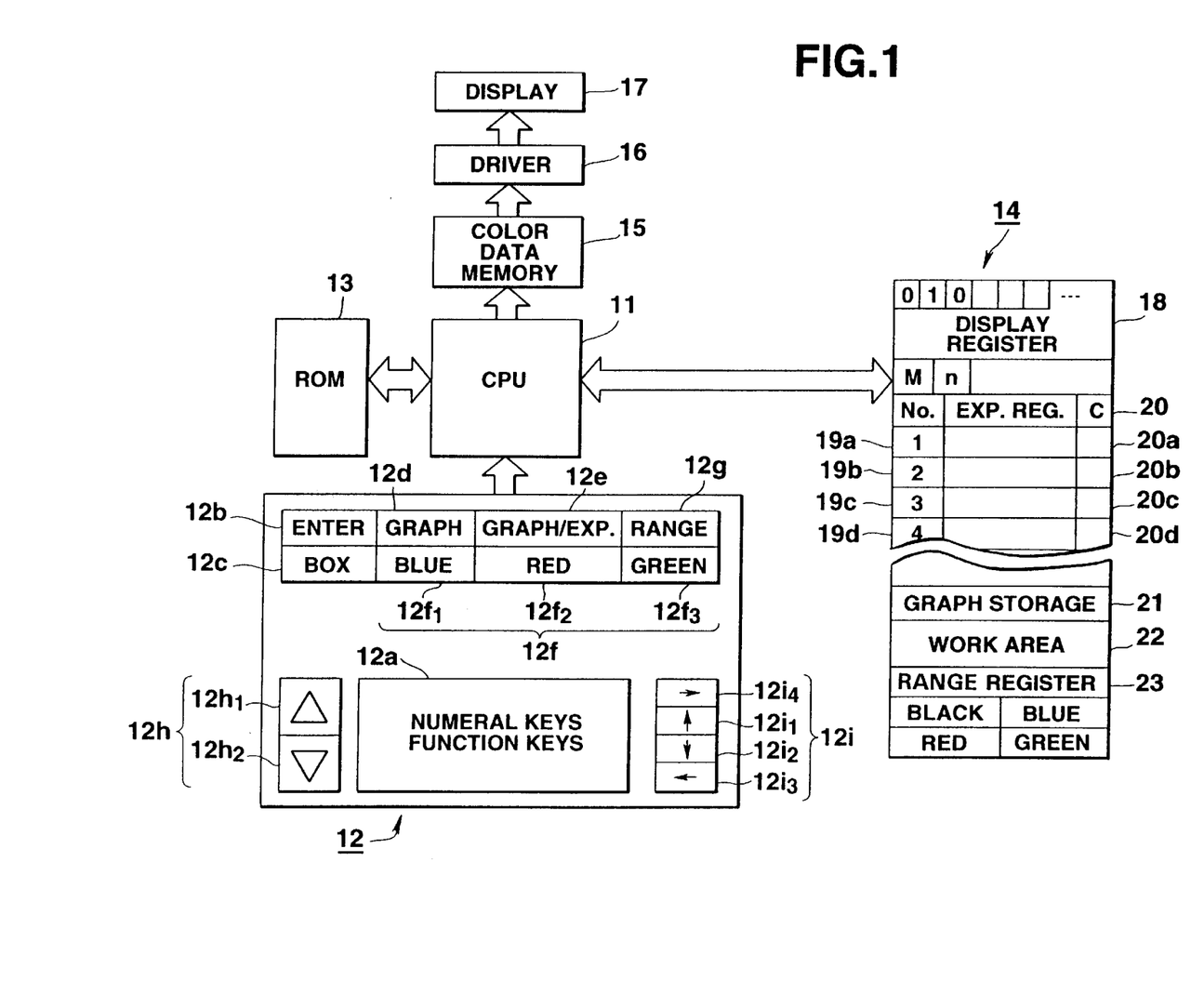
FIG. 1 is a block diagram of an electronic circuit of a computer having a graph displaying function as an embodiment of a graph displaying device according to the present invention.

FIG. 1 is a block diagram of an electronic circuit of a computer having a graph displaying function as an embodiment of a graph displaying device according to the present invention.

The computer includes a CPU 11, which starts up a system program contained in a ROM 13 in accordance with a key-in signal from a key-in unit 12 to control the respective operations of the circuit elements concerned. The CPU 11 is connected to the key-in unit 12 and ROM 13 as well as to a RAM 14, a color data memory 15 and via a display driver 16 to a color liquid crystal display 17.

The key-in unit 12 includes numeral keys and functional keys 12a, "ENTER" key 12b, "BOX" key 12c, "GRAPH" key 12d, "GRAPH/EXPRESSION" key 12e, color designating keys 12f ("BLUE" key $12f_1$, "RED" key $12f_2$, "GREEN" key $12f_3$), "RANGE" key 12g, range data selection keys 12h ("Δ" key $12h_1$, "∇" key $12h_2$), and cursor keys 12i ("↑" key $12i_1$, "↓" key $12i_2$, "←" key $12i_3$, "→" key $12i_4$).

The numeral and function keys 12a are operated to input data on desired expressions such as operation expressions and functional expressions, and numerical data. The "ENTER" key 12b is operated to command the execution of the respective functions.

The "BOX" key 12c is operated to set a box mode to discriminate a desired display range on a graph display screen by enclosing that range in a square (box).

The "GRAPH" key 12d is operated to calculate and display graph data corresponding to functional expression data input by operating the numeral keys and function keys 12a.

The "GRAPH/EXPRESSION" key 12e is operated to switch between the display state of the input functional expression data and the display state of graph data.

The color designating keys 12f ("BLUE" key $12f_1$, "RED" $12f_2$, "GREEN" key $12f_3$) are each operated to designate a graph display color for the input functional expression data.

The "RANGE" key 12g is operated to set respective X and Y coordinate ranges when their graph display is performed.

The range selection keys 12h ("Δ" key $12h_1$, "∇" key $12h_2$) are operated to select four respective kinds of coordinate ranges separated, for example, in four different colors ("BLACK", "BLUE", "RED" and "GREEN") when the coordinate ranges involved in the operation of the "RANGE" key 12g are set.

The cursor keys 12i ("↑" key $12i_1$, "↓" key $12i_2$, "←" key $12i_3$, "→" key $12i_4$) are operated to move the cursor on the display screen.

The ROM 13 contains a system program in charge of control over the whole operation of the computer, and subprograms in charge of control of operations in the calculation mode, graph display range setting mode, graph expression data inputting mode, graph displaying mode, range graph displaying mode and boxing mode.

The RAM 14 includes a display register 18, mode flag register M, cursor setting flag register n, expression registers 19 (19a, 19b, 19c, 19d, . . . ) designated color-registers C20 (20a, 20b, 20c, 20d, . . . ) graph storage area 21, work area 22 and range register 23.

The display register 18 has data storage locations corresponding in one-to-one relationship to display dots in the display area of the display 17 and stores bit map data composed of display data "1" which implies being lighted corresponding to black display and "0" which implies being unlighted corresponding to white display.

The mode flag register M sets therein flag data corresponding to the respective operation modes. The cursor setting flag register N sets therein "1" when a first cursor movement position is determined in the formation of a box in the boxing process.

The expression registers 19 (19a, 19b, 19c, 19d, . . . ) store input plural expression data. The designated color registers C20 (20a, 20b, 20c, 20d, . . . ) store displayed designated colors of the stored input expression data as "1", "2", "3", "4", . . . for black, blue, red, green, . . . respectively.

The graph storage area 21 stores respective graph data for the input expression data stored in the expression registers 19 (19a, 19b, l9c, 19d, . . . ) as respective bit map data corresponding to their display patterns.

The work area 22 temporarily stores various data input/output involved in various controlling processes performed by the CPU 11.

The range register 23 stores data on the four kinds of coordinate ranges obtained by setting the respective ranges of X and Y coordinates in the graph display in correspondence to four different designated colors "BLACK", "BLUE", "RED" and "GREEN".

The color data memory 15 includes four ("BLACK", "BLUE", "RED", "GREEN") data storage areas, each corresponding in one-to-one dot relationship to the display area of the display 17 similar to the display register 18 provided in the RAM 14. For example, when respective dot portions of display data to be stored in the display register 18 of RAM 14 are designated as black and blue, the respective designated dot portions are transferred directly to the corresponding black and blue display areas, respectively, of the color data memory 15 and then displayed via display driver 16 on the display 17. When the input expression data is stored, first, "1" indicative of black display is initially set in the designated color register C20 corresponding to the expression register 19 of the RAM 14.

The graph display of the inventive computer will be described next.

Figure 2:
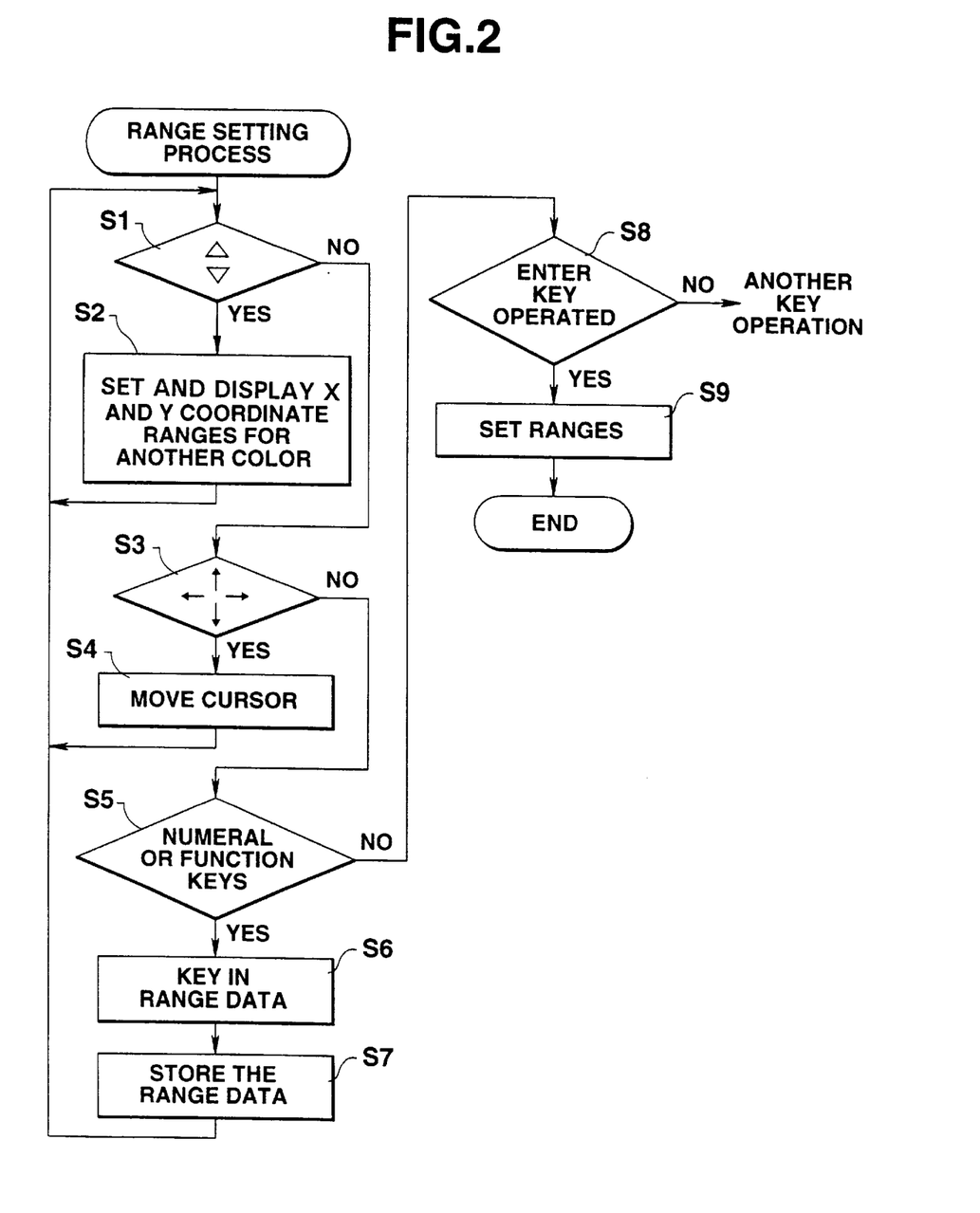
FIG. 2 is a flow chart indicative of the whole coordinate range setting process performed by the computer.

FIG. 2 is a flow chart indicative of the whole coordinate range setting process performed by the computer.

Figure 3:
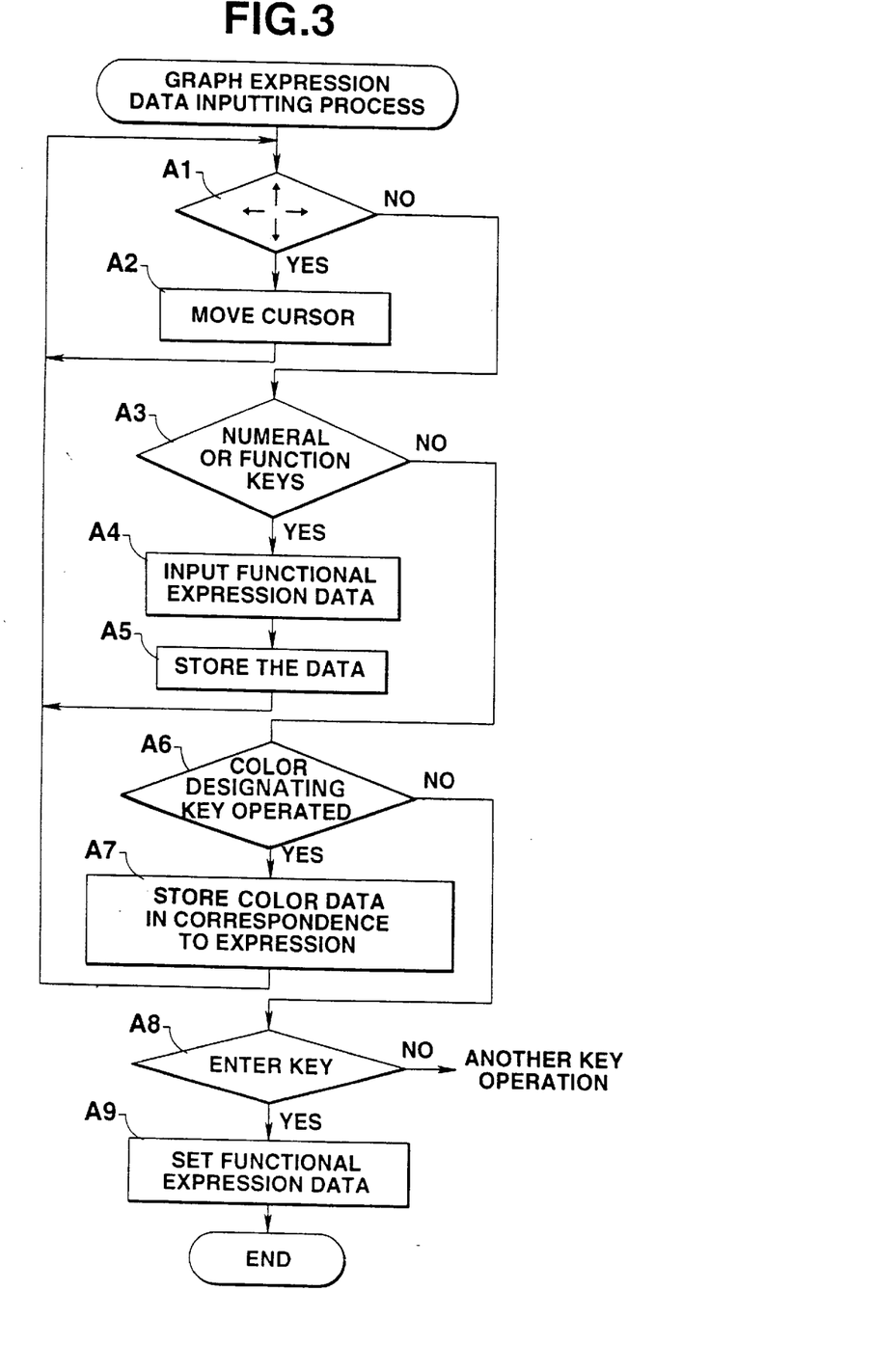
FIG. 3 is a flow chart indicative of a graph expression data inputting process performed in the computer.

FIG. 3 is a flow chart indicative of a graph expression data inputting process performed in the computer.

Figure 4:
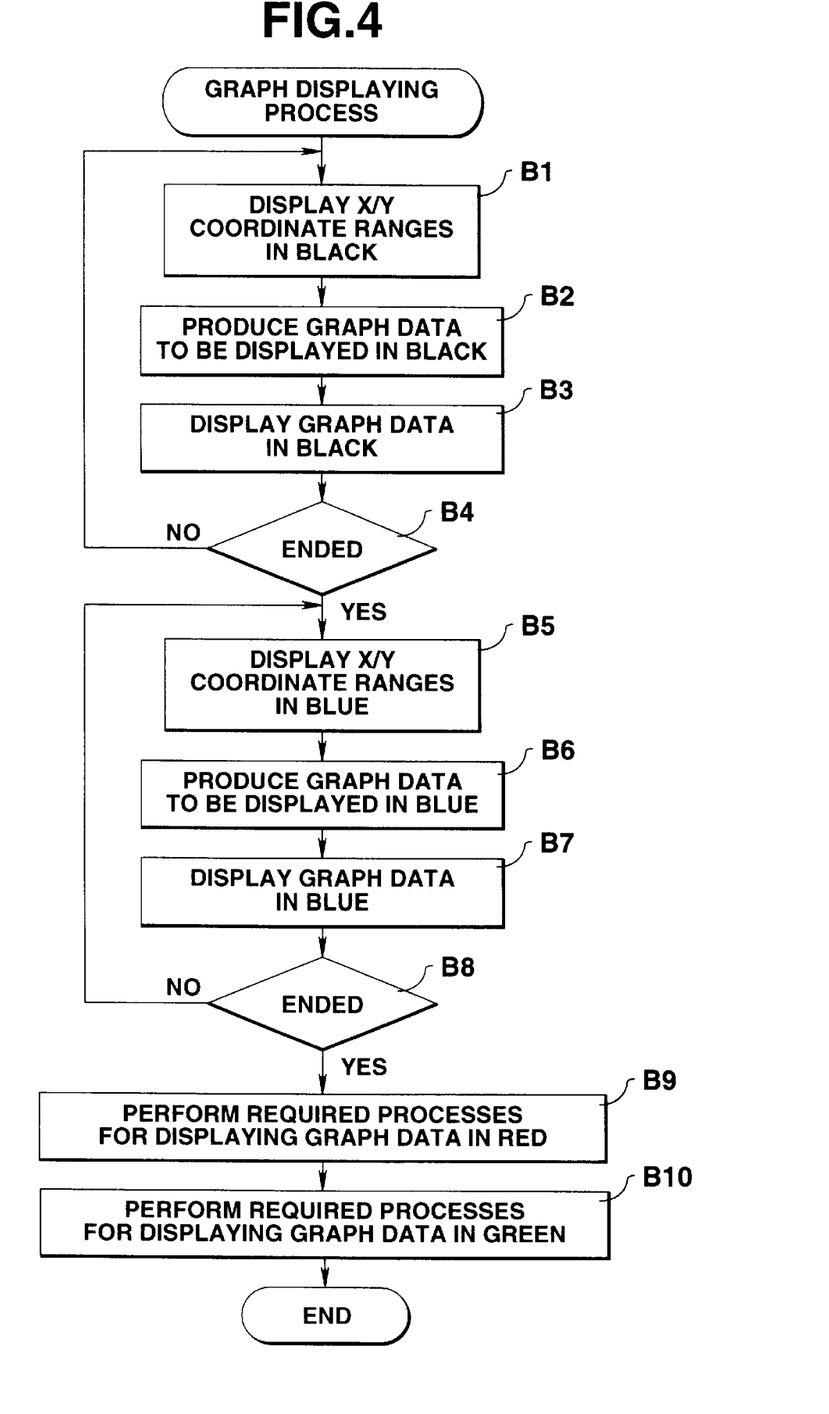
FIG. 4 is a flow chart indicative of a graph displaying process performed by the computer.

FIG. 4 is a flow chart indicative of a graph displaying process performed by the computer.

FIGS. 5A–5G show display operations corresponding to key operations involved in the whole coordinate range setting process, graph expression data inputting process and graph display process performed by the computer.

Figure 5A:
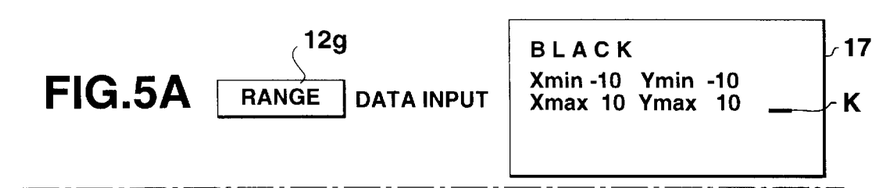
FIGS. 5A–5G show display operations corresponding to key operations involved in the whole coordinate range setting process, graph expression data inputting process and graph displaying process performed by the computer.

When the "RANGE" key 12g of the key-in unit 12 is operated, as shown in FIG. 5A, to set a coordinate range corresponding to the whole screen for the graph display in the whole coordinate range setting process of FIG. 2, a black range setting screen "BLACK/Xmin?, Xmax?/Ymin?, Ymax?" which urges the user to set the X and Y coordinate ranges corresponding to the black coordinates "BLACK" is initially displayed on the display 17.

When the numeral keys and function keys 12a are operated to input numerical data, the numerical data is displayed in the coordinate range corresponding to the position indicated by the cursor k and stored in the range register 23 of RAM 14, for example, as "BLACK/Xmin –10"(step S5→S6, S7).

When cursor keys 12i ("↑" key $12i_1$, "↓" key $12i_2$, "←" key $12i_3$, "→" key $12i_4$) are operated, the cursor k is moved correspondingly to a position where another range is set on the black range setting screen "BLACK/Xmin –10, Xmax?/Ymin?, Ymax?"(step S3→S4).

When the numerical and function keys 12a are then operated again to input, for example, "BLACK/Xmax 10", this data is stored in the range register 23 of RAM 14 (step S5→S6, S7).

Figure 5B:
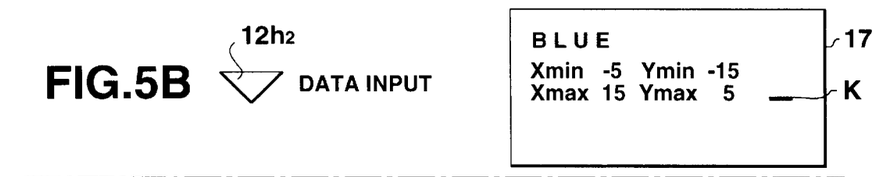

In this way, the respective range setting processes and cursor moving process at steps S3–S7 are repeated such that the X and Y coordinate ranges corresponding to the black coordinates "BLACK" are input and set, for example, as "BLACK/Xmin –10, Xmax 10/Ymin 10, Ymax 10" and stored in the range register 23 of RAM 14. When in such state the range data select key 12h ("∇" $12h_2$) is operated, as shown in FIG. 5B, a blue range setting screen "BLUE/Xmin?, Xmax?/Ymin?, Ymax?" which urges the user to set the X and Y coordinate ranges corresponding to the blue coordinates "BLUE" is displayed on the display 17 (step S1→S2).

Figure 5C:
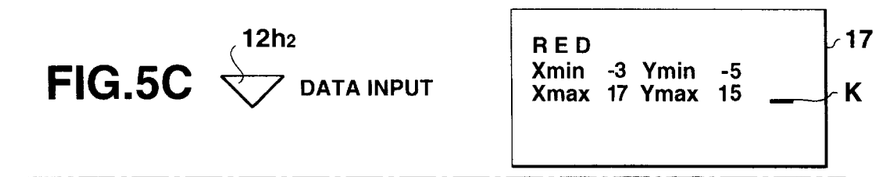

The respective range setting processes and cursor moving process at steps S3–S7 are then repeated such that the X and Y coordinate ranges corresponding to the blue coordinates "BLUE" are input and set, for example, as "BLUE/Xmin −5, Xmax 15/Ymin −15, Ymax 5" and stored in the range register 23 of RAM 14. When in such state the range data selection key 12h ("▽" 12$h_2$) is operated as shown in FIG. 5C, a red range setting screen "RED/Xmin?, Xmax?/Ymin?, Ymax?" which urges the user to set the X and Y coordinate ranges corresponding to the red coordinates "RED" is displayed on the display 17 (step S1→S2).

Figure 5D:
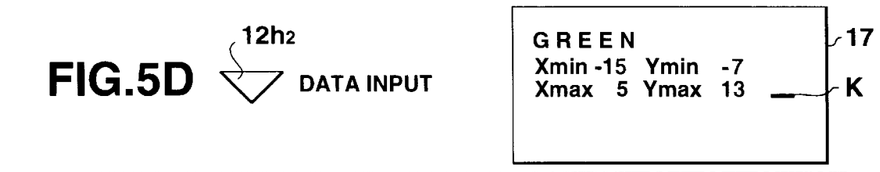

The respective range setting processes and cursor moving process at steps S3–S7 are further repeated such that the X and Y coordinate ranges corresponding to the red coordinates "RED" are input and set, for example, as "RED/Xmin −3, Xmax 17/Ymin −5, Ymax 15" and stored in the range register 23 of RAM 14. When in such state the range data selection key 12h ("▽" key 12$h_2$) is operated, as shown in FIG. 5D, a green range setting screen "GREEN/Xmin?, Xmax?/Ymin?, Ymax?" which urges the player to set X and Y coordinate ranges corresponding to green coordinates "GREEN" is displayed on the display 17. (step S1→S2).

When the respective range setting processes and cursor moving process at steps S3–S7 are further repeated such that the X and Y coordinate ranges corresponding to the green coordinates "GREEN" are input and set, for example, as "GREEN/Xmin −15, Xmax 5/Ymin 7, Ymax 13", those data are stored in the range register 23 of RAM 14.

If the "ENTER" key 12b is operated in the state where the four different coordinate ranges are stored in the range register 23 of RAM 14 as the result of the repetition of the steps S1–S7, the four kinds of coordinate ranges "BLACK/Xmin −10, Xmax 10/Ymin −10 stored in the range register 23, Ymax 10", "BLUE/Xmin −5, Xmax 15/Ymin −15, Ymax 5" "RED/Xmin −3, Xmax 17/Ymin −5, Ymax 15", and "GREEN/Xmin −15, Xmax 5/Ymin −7, Ymax 13" corresponding to the four different colors are fixed (step S8→S9).

Figure 5E:
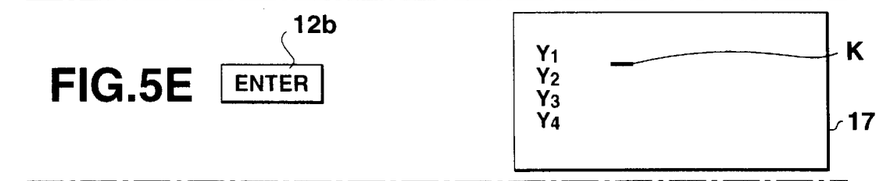

In response to this operation, an input screen for graph expression data "Y1/Y2/Y3/Y4" for graph display corresponding to the four kinds of coordinate ranges "BLACK/BLUE/RED/GREEN" is displayed on the display 17, as shown in FIG. 5E.

When in the graph expression data input process of FIG.3 the cursor keys 12i ("↑" key 12$i_1$, "↓" key 12$i_2$, "←" key 12$i_3$, "→" key 12$i_4$) of the key-in unit 12 are operated, the cursor k is moved on the graph expression data input screen and the position where the graph expression data indicated by the cursor k is input is switched among Y1, Y2, Y3 and Y4 (step A1→A2).

When the numeral keys and function keys 12a are operated, for example, to input functional expression "X +2" data in the state where the cursor k is displayed in correspondence to the first graph expression "Y1" on the graph expression data input screen, the input first graph expression "Y1=X+2" data is stored in the first expression register 19a of RAM 14 (step A3→A4).

When the first graph expression "Y1=X+2" data stored in the first expression register 19a is displayed in the black coordinate range "BLACK/Xmin −10, Xmax 10/Ymin −10, Ymax 10", the user is not required to operate any color designating keys 12f since "1" indicative of black display is initially set in the designated color registers C20 (20a, 20b, 20c, 20d, . . . ).

Then, assume that the movement of the inputting position of the graph expression data by the cursor keys 12i ("↑" key 12$i_1$, "↓" key 12$i_2$, "←" key 12$i_3$, "→" key 12$i_4$) and the inputting process of the functional expression data by the operation of the numeral keys or function keys 12a are repeated (steps A1–A5), and for example, the second graph expression "$Y_2$=2X" data is stored in the second expression register 19b of RAM 14. For example, when in such state the "BLUE" key 12$f_1$ of the color designation key 12f is operated to display the second graph expression "$Y_2$=2X" data stored in the second register 19b in the blue coordinate range "BLUE/Xmin −5, Xmax 15/Ymin −15, Ymax 5" set and stored in the range register 23, "2" indicative of blue display is stored and set in the corresponding designated color register 20b (step A6→A7).

Figure 5F:
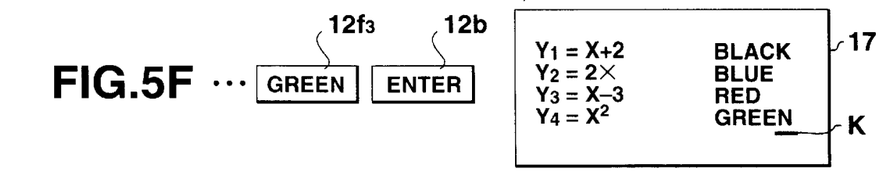

Thereafter, as shown in FIG. 5F, the steps A1–A7 are repeated to input third graph expression "$Y_3$=X−3" data and its designated color "RED" data are input and stored as "$Y_3$=X−3" and "3" in the third expression register 19c and the corresponding designated color register 20c, respectively. Fourth graph expression "$Y_4$=$X^2$" data and its designated color "GREEN" data are input and stored as "$Y_4$=$X^2$" and "4" in the fourth expression register 19d and the corresponding designated color register 20d, respectively. When the "ENTER" key 12b is then operated, the first-fourth graph expression data corresponding to the four different coordinate ranges and their designated color data are fixed (steps A8→A9).

Figure 5G:
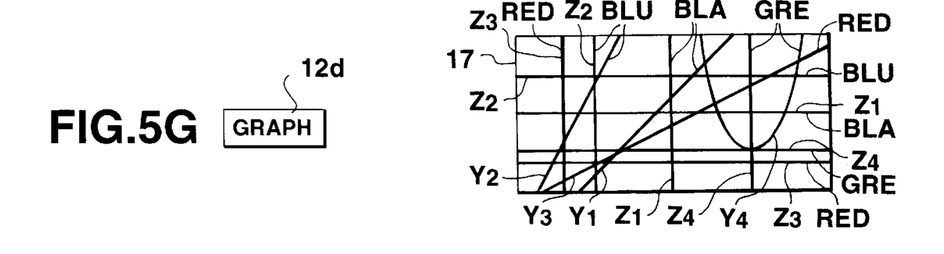

As shown in FIG. 5G, when the "GRAPH" key 12d of the key-in unit 12 is operated in the state where the four kinds of XY coordinate systems "BLACK", "BLUE", "RED" and "GREEN" and corresponding graph expression "$Y_1$", "$Y_2$", "$Y_3$" and "$Y_4$" data are input, set and stored in the expression registers 19 (19a, 19b, 19c, 19d), the designated color registers C20 (20a, 20b, 20c, 20d), and the range register 23, the graph displaying process of FIG. 4 is started up.

In this graph displaying process, first, an XY coordinate system $z_1$ (FIG. 5G) scaled as "−10 to 10" for the X coordinates and "−10 to 10" for the Y coordinates respectively, are displayed in black on the display 17 in correspondence to the black coordinate range "BLACK/Xmin −10, Xmax 10/Ymin −10, Ymax 10" stored in the range data register 23 (step B1).

The black coordinate range data is then substituted into the first graph expression "$Y_{,1}$=X+2" whose data is stored in the expression register 19a corresponding to the designated color register 20a in which a flag "1" indicative of black display is set to produce first graph data, which is delineated and stored in the graph storage area 21 (step B2).

In response to this operation, the first graph data $Y_1$ stored in the graph storage area 21 is superimposed and displayed in black on the XY coordinate system displayed in black on the display 17 (step B3).

When the delineation and display of the first graph data $Y_1$ in the black coordinates is terminated, the X and Y coordinate system $z_2$ (FIG. 5G) scaled as "−5 to −15" for the X coordinates and "−15 to 5" for the Y coordinates, respectively, and are displayed in blue on the display 17 in correspondence to the blue coordinate range "BLUE/Xmin −5, Xmax 15/Ymin −15, Ymax 5" stored in the range register 23 (step B4→B5).

The blue coordinate range data is then substituted into the second graph expression "$Y_2$=2X" whose data is stored in the expression register 19b corresponding to the designated color register 20b in which a flag "2" indicative of blue display is set to produce second graph data, which is then delineated and stored in the graph storage area 21 (step B6).

In response to this operation, the second graph data $Y_2$ stored in the graph storage area 21 is superimposed and displayed on the XY coordinate system displayed in blue on the display 17 (step B7).

When the delineation and display of the first and second graph data $Y_1$ and $Y_2$ in the black and blue coordinates is terminated, as mentioned above, XY coordinate system $z_3$ (FIG. 5G) scaled as "–3 to –17" for the X coordinates and "–5 to 15" for the Y coordinates are displayed in red on the display 17 in correspondence to the red coordinate range "RED/Xmin –3, Xmax 17/Ymin 5, Ymax –15" stored in the range register 23.

The red coordinate range data is then substituted into the third graph expression "$Y_3=X-3$" whose data is stored in the expression register 19c corresponding to the designated color register 20c in which a flag "3" indicative of red display is set to produce third graph data, which is then delineated and stored in the graph storage area 21.

In response to this operation, the third graph data $Y_3$ stored in the graph storage area 21 is superimposed and displayed in red on the XY coordinate system displayed in red on the display 17 (step B8→B9).

When the delineation and display of the first, second and third graph data $Y_1$, $Y_2$ and $Y_3$ in the black, blue and red coordinates is terminated, as mentioned above XY coordinate system $z_4$ (FIG. 5G) scaled as "–15 to –5" for the X coordinates and "–7 to 13" for the Y coordinates and are displayed in green on the display 17 in correspondence to the green coordinate range "GREEN/Xmin –15, Xmax 5/Ymin –7, Ymax 13" stored in the range register 23.

The green coordinate range data is then substituted into the fourth graph expression "$Y_4=X^2$" whose data is stored in the expression register 19d corresponding to the designated color register 20d in which a flag "4" indicative of green display is set to produce fourth graph data, which is then delineated and stored in the graph storage area 21.

In response to this operation, the fourth graph data $Y_4$ stored in the graph storage area 21 is superimposed and displayed in green on the XY coordinate system displayed in green on the display 17 (step B10).

Thus, as described above, in the graph expression data inputting and displaying process based on the setting of the different coordinate ranges separated in color, four XY coordinate systems corresponding to the four respective different coordinate ranges "BLACK", "BLUE", "RED", "GREEN" and $Z_1$, $Z_2$, $Z_3$, $Z_4$ are separated and displayed in the corresponding display colors and the graph expression data "$Y_1$", "$Y_2$", "$Y_3$", "$Y_4$" corresponding to XY coordinate systems for the respective coordinate ranges are separated and displayed in the respective designated colors in correspondence to the set coordinate ranges. Thus, even when the separate graph data corresponding to the four different coordinate ranges are displayed simultaneously, the respective coordinates and the corresponding graph data are displayed so as to be discriminated easily from each other.

Figure 6:
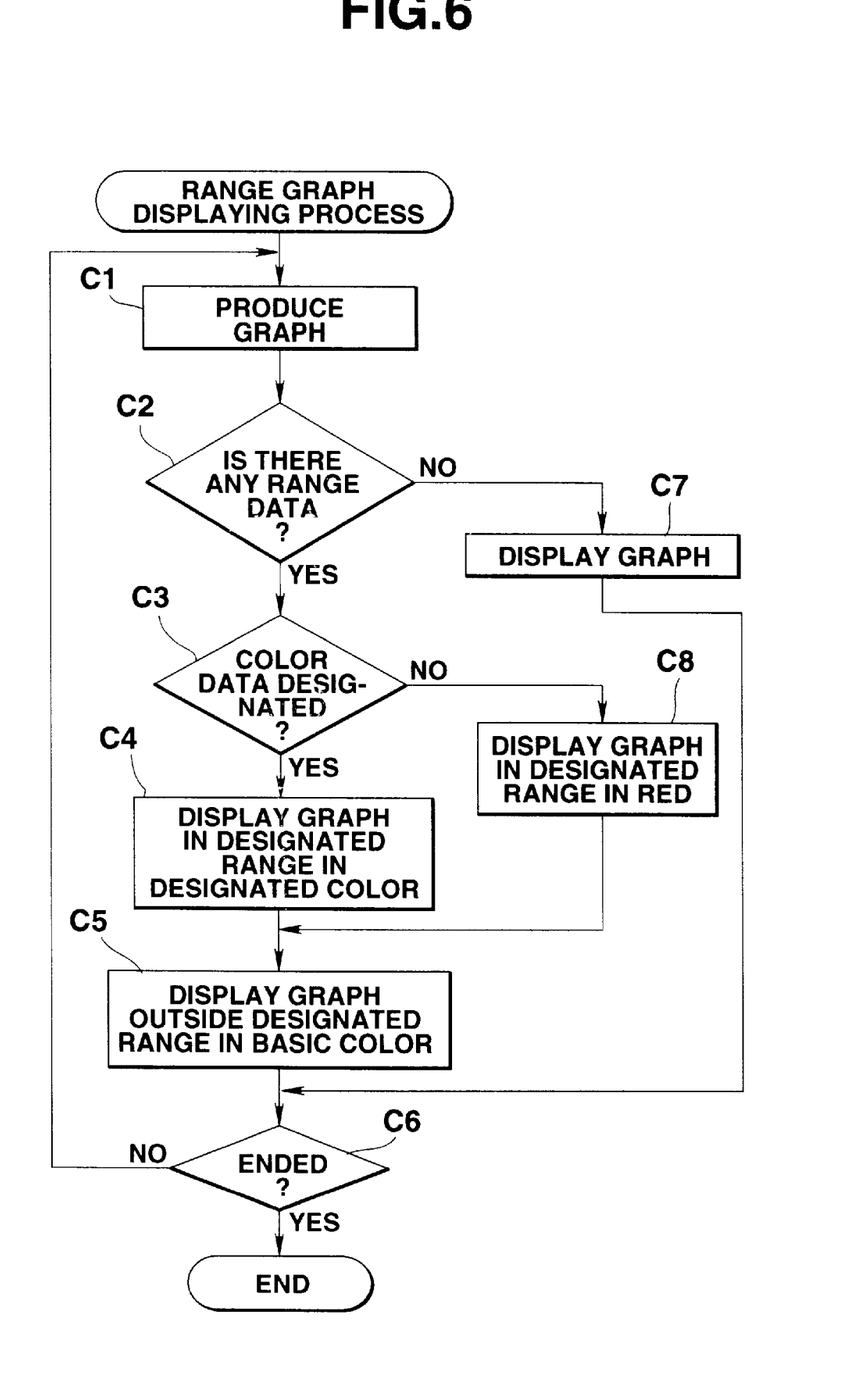
FIG. 6 is a flow chart indicative of a range graph displaying process performed by the computer.

FIG. 6 is a flow chart indicative of a range graph display process performed by the computer.

Figure 7A:
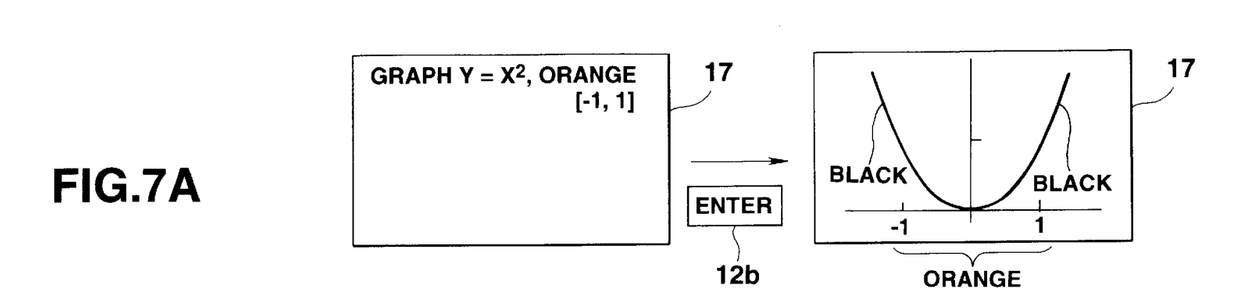
FIGS. 7A, B and C each show a display operation corresponding to an expression data inputting operation involved in the range graph displaying process performed by the computer.
Figure 7B:
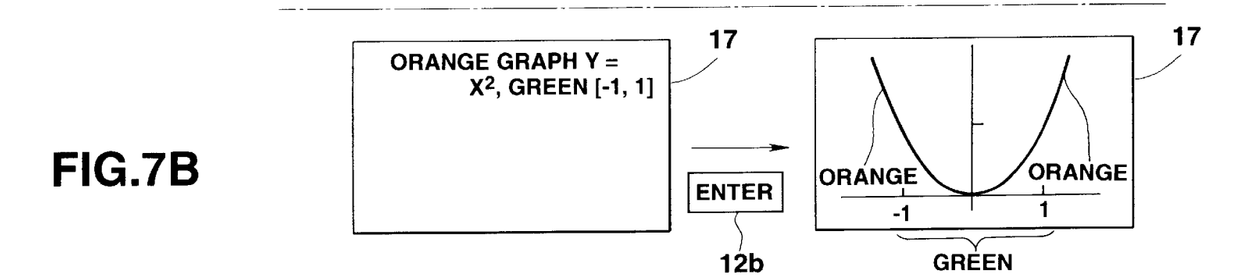
Figure 7C:
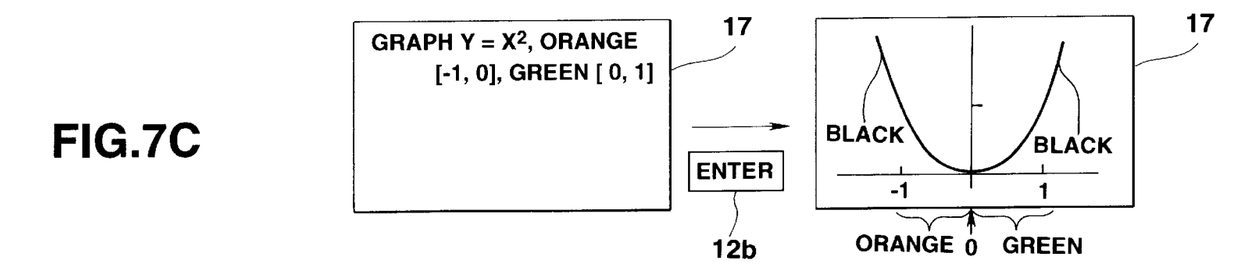

FIGS. 7A, B and C each show a display operation corresponding to an expression data inputting operation involved in the range graph display process performed by the computer.

For example, as shown in FIG. 7A, when (1) the numeral keys and function keys 12a are operated to input graph expression "GRAPH $Y=X^2$" data, (2) color-separated display range data "ORANGE [–1, 1]" is input and then (3) the "ENTER" key 12b is operated, graph data corresponding to the input graph expression "$Y=X^2$" data is calculated on the basis of the coordinate ranges set beforehand in correspondence to the display range of the display 17 and delineated and stored in the graph storage area 21 of RAM 14 (step C1).

When it is determined based on the input color-separated display range that the x-coordinate range [–1, 1] and the corresponding color "ORANGE" are designated, only the range of the graph corresponding to the designated X coordinate range [–1, 1] among the graph whose data is stored in the graph storage area 21 is separated and displayed in the designated color (orange) (step C2→C3→C4).

Simultaneously, the graph data outside the designated coordinate range among the graph data stored in the graph storage area 21 is displayed in the basic color (when undesignated, in "BLACK") (step C5, C6).

For example, as shown in FIG. 7B, when the numeral keys and function keys 12a are operated to input graph expression data as "ORANGE GRAPH $Y=X^2$" by designating its basic color and to input color-separated display range data as "GREEN [–1, 1]" and then the "ENTER" key 12b is operated, graph data corresponding to the input graph expression "$Y=X^2$" data is calculated on the basis of the coordinate ranges set beforehand in correspondence to the display range of the display 17 and delineated and stored in the graph storage area 21 of RAM 14 (C1).

When it is determined on the basis of the input color-separated display range that the X-coordinate range [–1, 1] and the corresponding color "ORANGE" are designated, only the range of the graph corresponding to the designated X coordinate range [–1, 1] among the graph whose data is stored in the graph storage area 21 is separated and displayed in the designated green (step C2→C3→C4).

Simultaneously, the graph portion outside the designated X-coordinate range among the graph whose data is stored in the graph storage area 21 is displayed in the designated orange as the basic color (step C5, C6).

For example, as shown in FIG. 7C, when the numeral keys and function keys 12a are operated to input graph expression "GRAPH $Y=X^2$" data and to input color-seperated display ranges "ORANGE [–1, 0] data, and GREEN [0, 1]" and then the "ENTER" key 12b is operated, graph data corresponding to the input graph expression "$Y=X^2$" data is calculated on the basis of the coordinate ranges set beforehand in correspondence to the display range of the display 17 and delineated and stored in the graph storage area 21 of RAM 14 (step C1).

When it is determined on the basis of the input color-separated display range that the x-coordinate range [–1, 0], [0, 1] and the corresponding color "ORANGE", "GREEN" are designated, the range of the graph data corresponding to the designated x-coordinate ranges [–1, 0] and [0, 1] among the graph data stored in the graph data storage area 21 are separated and displayed in the designated orange and green, respectively (step C2→C3→C4).

Simultaneously, the graph portion outside the designated coordinate ranges among the graph whose data is stored in the graph storage area 21 is displayed in the basic color (when undesignated, in black)(step C5, C6).

When it is determined that there is no designated range data corresponding to the X coordinates at step graph data stored in the graph storage area 21 is directly displayed in the basic color (when undesignated, in black) (step C2→C7, C6).

If it is determined at step C3 that there is no designated color data even when it is determined at step C2 that there is designated X-coordinate range data, only the range of graph corresponding to the designated X-coordinate range among graph data stored in the graph storage area 21 is displayed separately in red and graph portion outside the designated coordinate range is displayed in the basic color (when undesignated, in black) (step C2→C3→C8, C5, C6).

Thus, when in the range graph displaying process the graph expression data and the range data corresponding to the X coordinates are input, only a portion of the graph for the graph expression and corresponding to the input range data is displayed in a color different from that for the remaining portion of the graph for the graph expression and the remaining graph data is displayed in the basic color. Thus, the whole shape of the graph for the graph expression is gripped in a clearly color-separated manner from the shape of the designated range of the graph.

While in the embodiment the range for the X coordinates has been designated by inputting the corresponding range data, the range may be designated by Y coordinates, of course.

Figure 8:
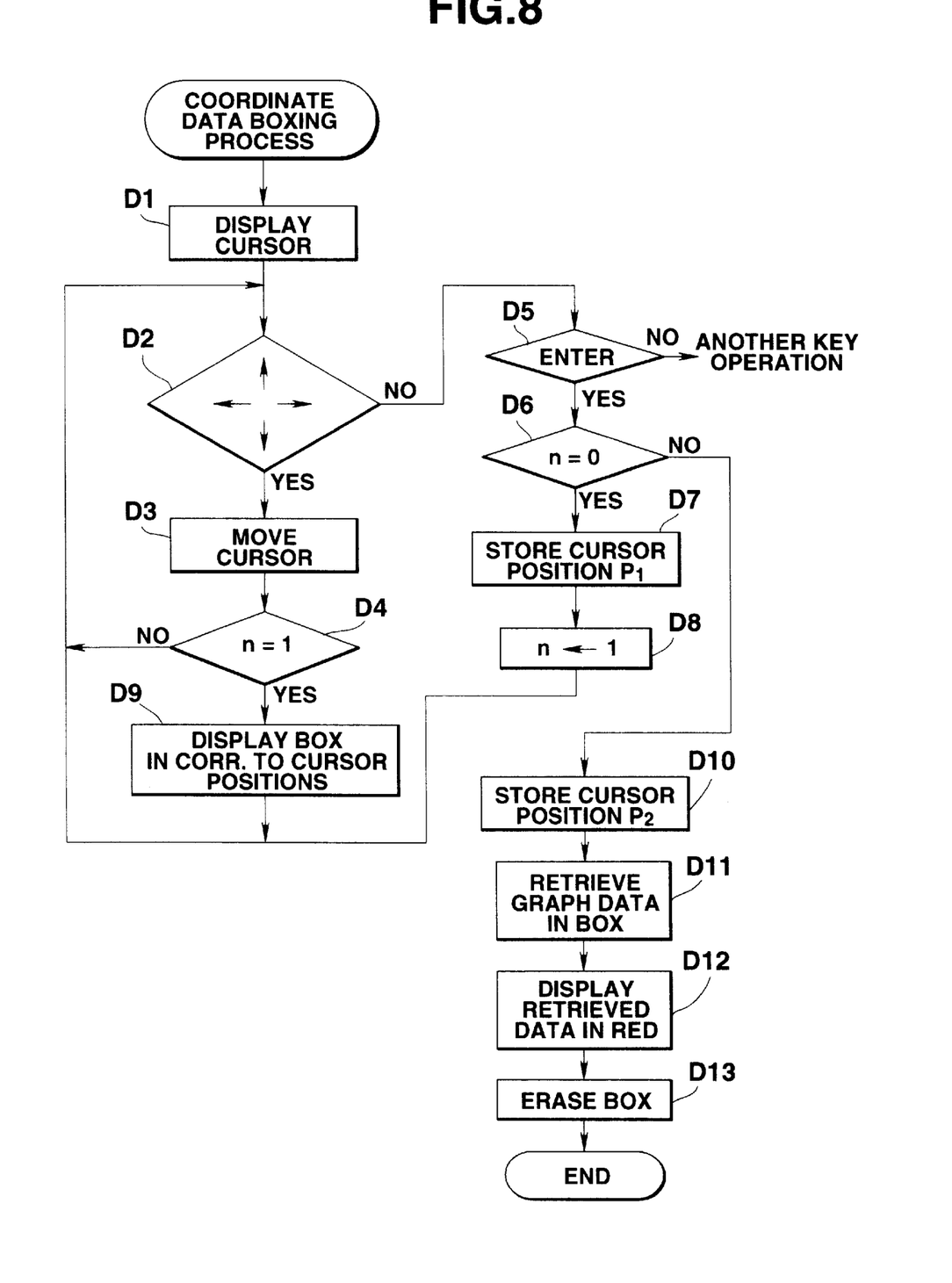
FIG. 8 is a flow chart indicative of a coordinate data boxing process performed by the computer.

FIG. 8 is a flow chart indicative of a coordinate data boxing process performed by the computer;

FIGS. 9A–9E each shows display operations corresponding to key operations involved in the coordinate data boxing process performed by the computer.

Figure 9A:
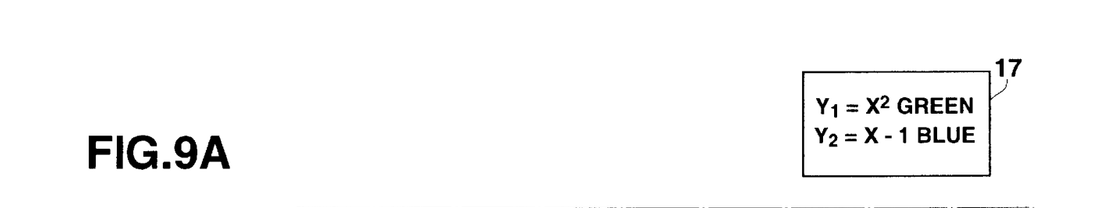
FIGS. 9A–9E each shows display operations corresponding to key operations involved in the coordinate data boxing process performed by the computer.
Figure 9B:
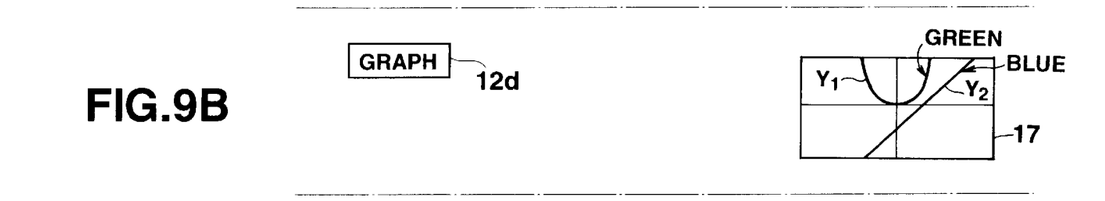

As shown in FIG. 9A, for example, in the graph expression data inputting process of FIG. 3, two-graph expressions "$Y_1=X^2$", "$Y_2=X-1$" data and the corresponding display color "GREEN", "BLUE" data are input, designated, respectively, and displayed and stored in the expression registers 19a, 19b and the designated color registers 20a, 20b, respectively. As shown in FIG. 9B, when the "GRAPH" key 12d is then operated, the graph display process of FIG. 4 is performed in which graph data corresponding to the first graph expression "$Y_1=X^2$", data stored in the first expression register 19a is displayed in green in correspondence to the display color "GREEN" designated in the designated color register 20a, and graph data corresponding to the second graph expression "$Y_2=X-1$" stored in the second expression register 19b is displayed in blue in correspondence to the display color "BLUE" designated in the designated color register 20b.

Figure 9C:
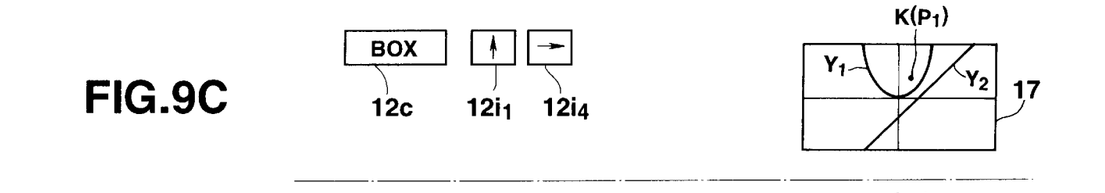

As shown in FIG. 9C, when the "BOX" key 12c of the key-in unit 12 is operated in the state where the desired graph data is displayed in color on the display 17, the boxing process of FIG. 8 is started up to thereby display the cursor k at the center of the graph display screen (step D1).

When the cursor keys 12i ("↑" key $12i_j$, "→" key $12i_4$) are sequentially operated, the cursor k on the screen is moved rightward and upward (step D2→D3).

At this time, since the cursor setting flag register n in RAM 14 is set initially at "0", "NO" is determined at step D4.

Figure 9D:
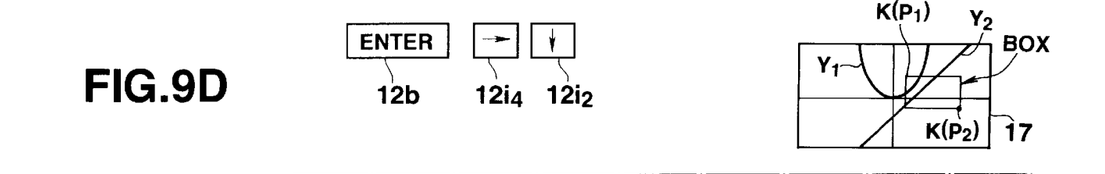

As shown in FIG. 9D, when the "ENTER" key 12b is operated in the state where the cursor k on the graph display screen is moved to a first cursor position P1, it is determined that "0" is set in the cursor setting flag register n, X/Y coordinate data corresponding to the first cursor position P1 are stored in the work area 22, and "1" is then set in the cursor setting flag register n (step D5→D6→D7, D8).

When the cursor keys 12i ("→" key $12i_4$, "1" key $12i_2$) are then operated sequentially, the cursor k on the screen is moved from the first cursor position P1 rightward and downward (step D2→D3).

At this time, since the cursor setting flag register n in RAM 14 is set at "1" when the first cursor position P1 was set, "YES" is determined at step D4 and a box corresponding to the first cursor position P1 and the current position of the cursor k is displayed (step D4→D9).

Figure 9E:
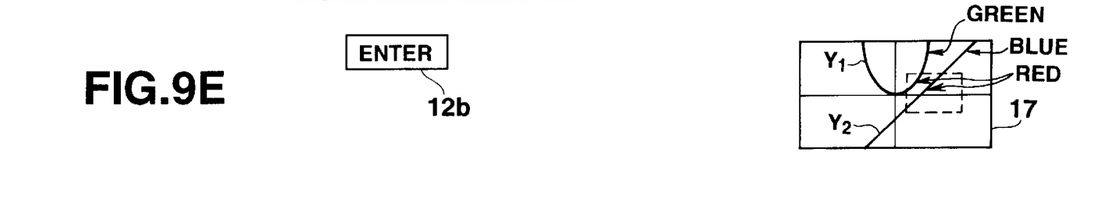

As shown in FIG. 9E, when the "ENTER" key 12b is operated in the state where the cursor k on the graph display screen is moved to a second cursor position P2 and a desired range on the graph display screen is enclosed in a box, X/Y coordinate data corresponding to the second cursor position P2 are stored in the work area 22 because it is determined that "1" is set in the cursor setting flag register n (step D5→D6→D10).

In response to this operation, graph data in the X/Y coordinate range enclosed in the box is retrieved on the basis of the graph data corresponding to the first and second graph expressions "$Y_1=X^2$", and "$Y_2=X-1$" data stored in the graph storage area 21 and the respective X/Y coordinate data corresponding to the first and second cursor positions P1, P2 stored in the work area 22, and the retrieved graph data in the box is displayed separately in red (steps D11, D12).

Simultaneously, the box shape displayed when the cursor was moved from the first cursor position P1 to the second cursor position P2 is erased (step D13).

Thus, in the boxing process, the graph data in the range enclosed in the box as the cursor was moved on the display screen for the desired graph data is displayed separately in a different color.

Thus, according to the present computer as the embodiment, in the whole graph coordinate range setting process started up by the "RANGE" key 12g of the key-in unit 12, four-different X and Y coordinate range data are set in the range register 23 of RAM 14 in correspondence to the display colors "BLACK", "BLUE", "RED" and "GREEN" and the graph expression data displayed in the respective coordinate ranges are input in the corresponding display colors and stored in the expression register 19 of RAM 14. When the "GRAPH" key 12d is operated to designate graph display in such state, the respective X/Y coordinates in the four different coordinate ranges set in the range register 23 are displayed as "black coordinates", "blue coordinates", "red coordinates" and "green coordinates" in corresponding different colors, and graph expression data placed in corresponding relationship to respective color designating data which each designate the same color as a respective one of the XY coordinate systems are produced, the corresponding expression graphs are delineated and displayed in the respective colors designated by the color designated data. Thus, even when separate graph data based on different coordinate ranges are displayed simultaneously, the respective graph data can be discriminated easily from each other.

According to the present computer as the embodiment, graph expression data is input, the coordinate range corresponding to X or Y coordinates is designated in color and set. When graph delineation is designated, graph data for the graph expression is produced, only graph data for the set coordinate range is separately displayed in a designated color and graph data outside the set range is displayed in the basic color (when undesignated, in black). Thus, the whole shape of the graph and the graph data and the shape of the graph portion in the set range are displayed in an easily discriminable manner.

What is claimed is:

1. A graph displaying device comprising:
   functional expression data inputting means for inputting functional expression data representing a functional expression including a plurality of variables;
   range setting means for setting a range of at least one of the plurality of variables included in the functional expression using a numerical input;
   storage means for storing the set range and the functional expression data in corresponding relationship;

graph producing means for producing a graph of the functional expression represented by the functional expression data stored in the storage means;

graph displaying means for displaying the graph produced by the graph producing means; and range graph displaying means for causing a portion of the displayed graph in the corresponding set range stored in the storage means to be displayed in a color which is different from that of a remainder of the graph.

2. The graph displaying device according to claim 1, further comprising display color designating means for designating the different color in which the portion of the displayed graph is to be displayed.

3. The graph displaying device according to claim 1, further comprising display color setting means for setting color data with respect to the input functional expression data, and wherein the graph displaying means comprises means for displaying the graph in color in accordance with the set color data.

4. The graph displaying device according to claim 1 wherein said range setting means comprises means for setting a plurality of ranges with respect to at least one of the plurality of variables included in the functional expression represented by the functional expression data, and said range graph displaying means comprises means for causing a plurality of portions of the displayed graph in the plurality of set ranges to be displayed in a corresponding plurality of different colors which are different from that of a remainder of the graph.

5. The graph displaying device according to claim 4, further comprising display color designating means for designating the plurality of different colors in which the plurality of portions of the displayed graph are to be displayed.

6. A graph displaying device comprising:

functional expression data inputting means for inputting functional expression data representing a plurality of functional expressions;

functional expression color data inputting means for inputting functional expression color data representing a plurality of different colors corresponding to the plurality of functional expressions;

functional expression and color data storing means for storing the functional expression data and the functional expression color data in corresponding relationship;

coordinate axis range data inputting means for inputting range data representing a plurality of ranges of X and Y coordinate axes;

coordinate axis range color data inputting means for inputting range color data representing a plurality of different colors corresponding to the plurality of ranges of X and Y coordinate axes;

coordinate axis range and color storage means for storing the range data and the range color data in corresponding relationship;

coordinate axis display means for displaying a plurality of coordinate systems of X and Y coordinate axes corresponding to the range data stored in the coordinate axis range and color data storage means in the corresponding plurality of different colors represented by the range color data stored in the coordinate axis range and color data storage means;

graph producing means for producing, on the displayed plurality of coordinate systems of X and Y coordinate axes, a plurality of graphs of the plurality of functional expressions represented by the functional expression data stored in the functional expression and color data storing means; and graph displaying means for causing the displayed plurality of graphs to be displayed in the corresponding plurality of different colors represented by the functional expression color data stored in the functional expression and color data storing means in a manner such that respective graphs of a given color are displayed on respective coordinate axes of the same color.

7. A recording medium having recorded thereon a computer readable program for enabling a computer to operate as:

functional expression data inputting means for inputting functional expression data representing a functional expression including a plurality of variables;

range setting means for setting a range of at least one of the plurality of variables included in the functional expression using a numerical input;

storage means for storing the set range and the functional expression data in corresponding relationship;

graph producing means for producing a graph of the functional expression represented by the functional expression data stored in the storage means;

graph displaying means for displaying the graph produced by the graph producing means; and range graph displaying means for causing a portion of the displayed graph in the corresponding set range stored in the storage means to be displayed in a color which is different from that of a remainder of the graph.

8. A recording medium having recorded thereon a computer readable program for enabling a computer to operate as:

functional expression data inputting means for inputting functional expression data representing a plurality of functional expressions;

functional expression color data inputting means for inputting functional expression color data representing a plurality of different colors corresponding to the plurality of functional expressions;

functional expression and color data storing means for storing the functional expression data and the functional expression color data in corresponding relationship;

coordinate axis range data inputting means for inputting range data representing a plurality of ranges of X and Y coordinate axes;

coordinate axis range color data inputting means for inputting range color data representing a plurality of different colors corresponding to the plurality of ranges of X and Y coordinate axes;

coordinate axis range and color storage means for storing the range data and the range color data in corresponding relationship;

coordinate axis display means for displaying a plurality of coordinate systems of X and Y coordinate axes corresponding to the range data stored in the coordinate axis range and color data storage means in the correspond ing plurality of different colors represented by the range color data stored in the coordinate axis range and color data storage means;

graph producing means for producing, on the displayed plurality of coordinate systems of X and Y coordinate axes, a plurality of graphs of the plurality of functional expressions represented by the functional expression data stored in the functional expression and color data storing means; and graph displaying means for causing the displayed plurality of graphs to be displayed in the corresponding plurality of different colors represented by the functional expression color data stored in the functional expression and color data storing means in a manner such that respective graphs of a given color are displayed on respective coordinate axes of the same color.

* * * * *